Oct. 23, 1956  R. D. SMITH  2,767,764
DEVICE FOR STRAIGHTENING WHEELS
Filed Jan. 19, 1953  2 Sheets-Sheet 1

Roy D. Smith
INVENTOR.

BY *Cecil L. Wood*

ATTORNEY

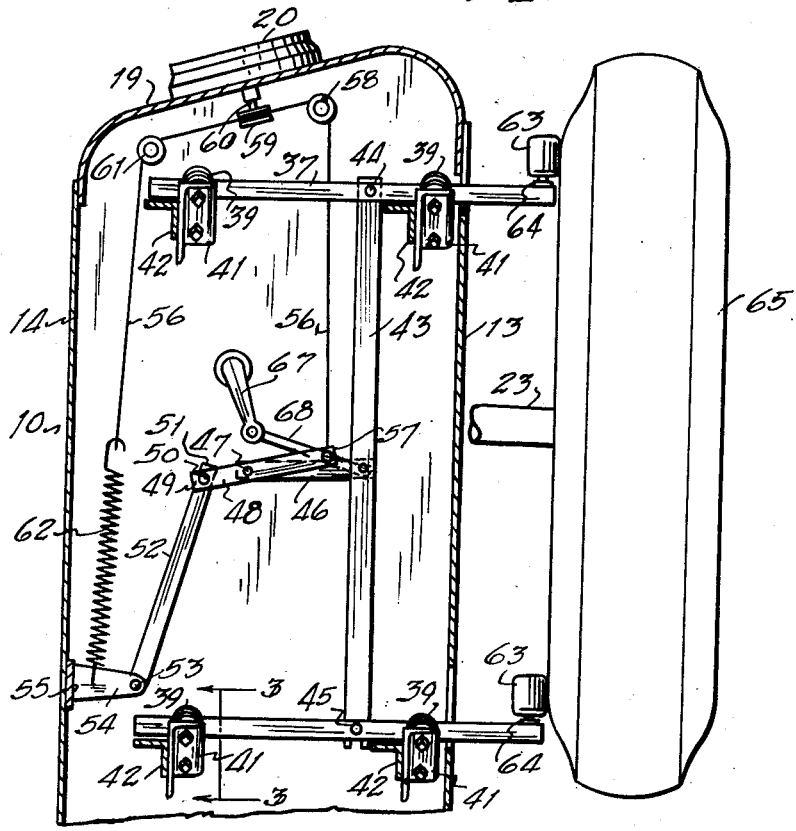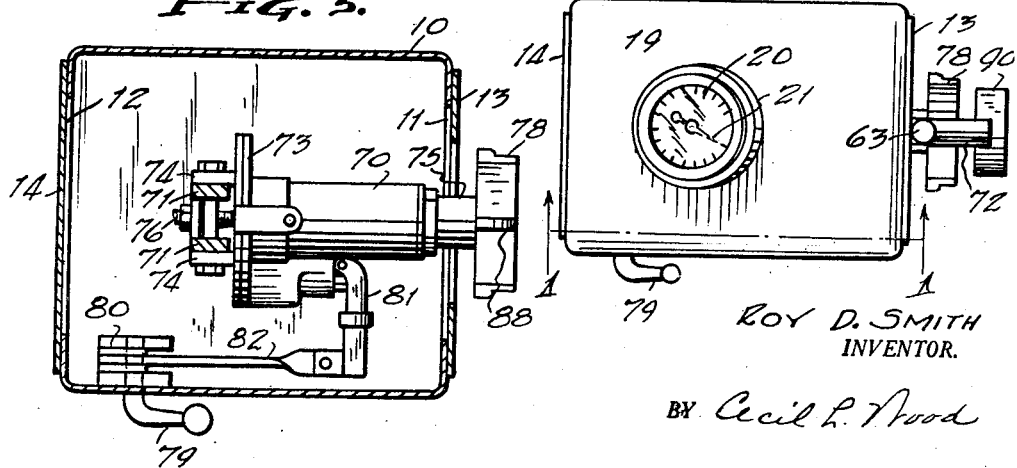

United States Patent Office 2,767,764
Patented Oct. 23, 1956

2,767,764

DEVICE FOR STRAIGHTENING WHEELS

Roy D. Smith, Fort Worth, Tex., assignor to Smith Engineering Company, Fort Worth, Tex., a partnership comprised of Richard D. Englehart, J. E. Sebolt, K. A. Andrews, and Roy D. Smith Application January 19, 1953, Serial No. 331,776

5 Claims. (Cl. 153—32)

This invention relates to mechanisms for correcting the dynamic distortion of automobile wheels, or for balancing the same by eliminating the "wobble" or vacillations commonly occasioned by warping of the wheel or distorting the same by road hazards and abuse and its principal object resides in the provision of apparatus by which the degree of dynamic distortion can be quickly and accurately determined by an indicator mechanism and suitable pressures applied at proper radial points of the wheel to eliminate such distortion and properly balance the same whereby the axis of rotation of the wheel can be properly related to the dynamic balance force thereof.

Another object of the invention resides in the provision of apparatus which, by a simple arrangement of parts, can be utilized with great efficiency in checking or determining the degree of distortion of balance, or "wobble," of a wheel without removing the pneumatic tire therefrom and exerting sufficient pressures against the peripheral rim thereof at critical points to axially align the same whereby a perfect rotative balance can be accomplished.

A still further object of the invention is to provide a mechanism by which rotative objects and pneumatic tired automotive wheels, in particular, can be balanced both statically and dynamically without the application of weights to the outer side of the wheel and to eliminate the unsightliness of such weights on modern wheels as well as afford a more accurate and desirable balancing method.

An object of the invention is that of affording apparatus by which any unbalanced condition of a wheel can be corrected completely and without further attention, as by replacing detached weights, often lost in the normal movement of the vehicle, and providing a novel means whereby much unnecessary wear and disintegration of tires and bearings is minimized or prevented.

Broadly, the invention contemplates the provision of a mechanism which is simple and economical in design, yet capable of providing a dependable and accurate means of determining the degree of dynamic "unbalance" of a wheel and effectively correcting the same with the least amount of expended effort and time.

While the foregoing objects are paramount, other objects will become manifest as the description proceeds taken in connection with the appended drawings wherein:

Figure 4 is another vertical sectional view of the invention showing only the gauging mechanism, the pressure elements having been removed.

Figure 5 is a lateral sectional view on lines 5—5 of Figure 1, showing the hydraulic pressure device for straightening the wheel, and illustrating the lever for operating the same, and Figurge 6 is a plan view of the invention showing the dial indicator for the gauging mechanism and illustrating the pressure and counter-pressure elements for correcting the wheel distortion.

It has long been customary to place weights on the rim flanges of automotive wheels in an attempt to balance the same when it is apparent that the wheel vibrates at certain speeds. One method in use consists of jacking up the wheel so that the heavy portion will come to rest at the bottom as the wheel rotates. This method is very unreliable in that no provision is made to measure the degree of dynamic unbalance. Other methods include placing the wheel upon a special balancing machine which rotates the wheel and various methods are used to determine the degree and location of the unbalanced condition. Usually machines of this character require that weights be placed on both sides of the wheel in an effort to balance the same. This detracts from the natural beauty of the wheel through the addition of the unsightly weights to the outside of the wheel, and if the wheel is slightly bent it is usually impossible to balance it dynamically by this method.

The present invention will eliminate the necessity of placing weights on the outer side of the wheel and will actually correct any dynamic unbalance existing therein by applying force at an indicated point about the rim of the wheel against properly applied counter-forces on the opposite side of the axial mounting thereof from the applied force on the rim of the wheel after pre-determining the location and amount of dynamic unbalance or wheel distortion.

Figure 1:
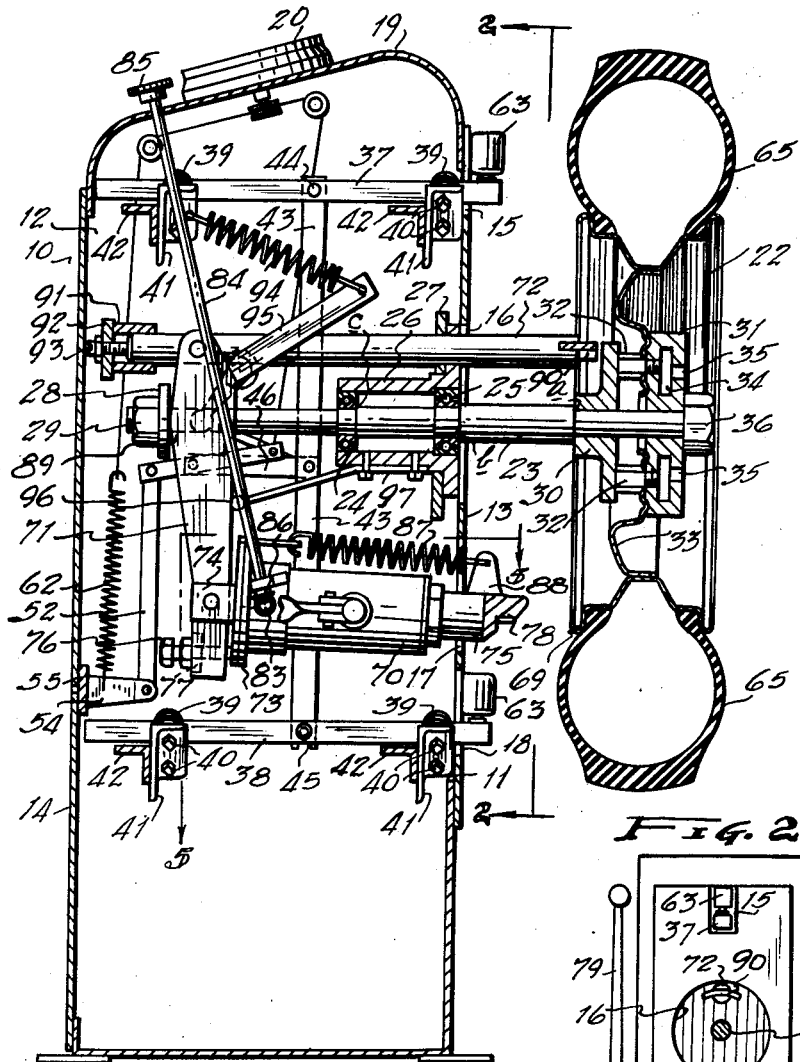
Figure 1 is a vertical sectional view of the invention, on lines 1—1 of Figure 6, illustrating the simple arrangement of parts for determining the degree of imperfect dynamic balance and correcting the same.
Figure 2:
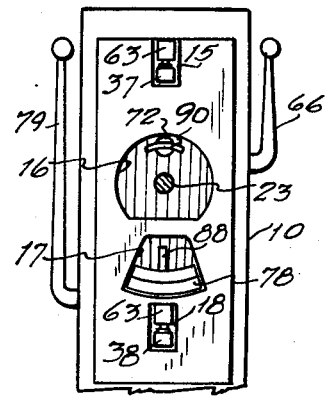
Figure 2 is a front view of the invention on lines 2—2 of Figure 1.

Accordingly, therefore, the invention comprises a housing or cabinet 10 which is preferably provided with front and rear openings 11 and 12 which are covered by panels 13 and 14, as shown in Figures 1, 4 and 5. The front panel 13 has openings 15, 16, 17 and 18 therein, as shown in Figures 1 and 2, through which some of the elements of the invention are operatively projected, as will presently become apparent.

The housing 10 is designed to present an attractive appearance and has a top 19 which preferably inclines rearwardly, as in Figures 1 and 4, and has an indicating dial 20 thereon which has a pointer 21 whereby to indicate the degree of dynamic distortion existing in a wheel 22 tested and corrected on the invention when applied thereto in the manner shown in Figures 1 and 4.

The housing 10 has a frame structure arranged therein comprising a plurality of horizontally disposed supporting members which operatively support the several elements of the invention. A spindle 23 is mounted in the housing 10 and is rotatably supported by bearings 24 and 25 which are encased by a flanged cylindrical sleeve 26 supported by a plate 27 which is arranged across the inner face of the front panel 13, as shown in Figure 1. The rear end of the spindle 23 has a washer 28 thereon secured by a nut 29 threaded upon the spindle 23.

The outer end of the spindle 23 extends through the opening 16 in the front panel 13 and projects substantially from the front of the housing 10. The spindle 23 is formed with a plurality of shoulders $a$, $b$ and $c$, the shoulders $b$ and $c$ being engaged by the bearings 24 and 25, while the shoulder $a$ is engaged by a flanged member 30. The wheel 22 is secured to a circular plate 31 by cap screws 32 arranged through its hub flange 33, as apparent in Figure 1.

The plate 31 may be formed with a hollow annular chamber 34 therein to provide substantial thickness for the element and accommodate interiorly threaded bores 35 of different spacings on each side to receive the cap screws 32 so that wheels having differently spaced hub apertures can be secured thereto, the plate 31 being reversible and secured on the end of the spindle 23 by a nut 36, the heads of the cap screws 32 bearing against the flanged member 30. The wheel 22 is thus rigidly secured on the spindle 23 so that when the wheel is rotated the spindle 23 rotates in the bearings 24 and 25.

Figure 3:
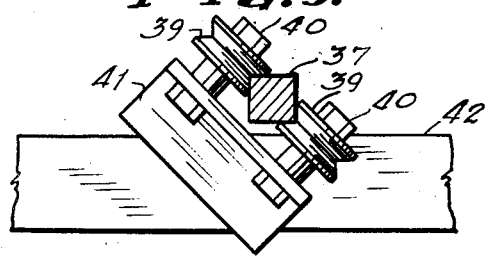
Figure 3 is a detailed illustration of the roller supports for the gauging bars, on lines 3—3 of Figure 4.

Spaced above and below the spindle 23, and in longitudinal alignment therewith, are gauging bars 37 and 38 which are preferably rectangular in transverse section, as illustrated in Figure 3, and each is operatively supported for longitudinal movement between two pairs of V-pulleys 39 whose axes 40 are angularly disposed, as shown particularly in Figure 3, and comprise bolts which are secured in angular brackets 41 attached to angular supporting members 42 arranged horizontally in the housing 10.

The gauging bars 37 and 38 are connected by a vertical lever 43 which is pivotally attached at its upper end to the upper bar 37 by a pin or rivet 44 while its lower end is bifurcated and provided with a suitable bearing 45 by which it is pivotally and slidably connected to the lower bar 38. Intermediate the ends of the lever 43 is an arm 46 which is rigidly secured at one end to the lever 43 and extends at right angles therefrom rearwardly of the housing 10. The outer end of the arm 46 has a pivotal connection 47 with a lever 48 toward the rearmost end 49 thereof which is pivotally secured by a pin 50 to the upper end 51 of a link 52 which operates in a substantially vertical plane, its lower end being pivotally attached by a pin 53 to a bracket 54 secured to a horizontal frame member 55. This arrangement is shown in Figure 4.

A cable 56 is attached at one end to the free end 57 of the lever 48 and extends upwardly and over a pulley 58, which has a horizontal axis, and is looped about a pulley 59 on the lower end of the vertical shaft 60 of the indicator pointer 21 of the dial 20 on the top 19 of the housing 10. The cable 56 is then arranged over another pulley 61, also on a horizontal axis, and thence extends downwardly to be connected to one end of a pull spring 62 whose opposite end is secured to the bracket 54 to which the lower end of the lever 52 is connected.

Mounted on the outer ends of the bars 37 and 38 are rollers 63 each having a vertical axle 64. The rollers 63 are engageable with the inner side wall of the tire 65 on the wheel 22, as illustrated in Figure 4. Although the bars 37 and 38 are connected by the lever 43 these members can move longitudinally in opposite directions as well as in unison in the same direction, and if there is any distortion of balance, or deviation in the axis of rotation of the wheel, such will be indicated by the pointer 21 on the dial 20 by the operation of the bars 37 and 38, even though only slight variations may be evident.

It is apparent that if the wheel 22 is properly attached to the spindle 23, and the latter is properly aligned, the wheel can be freely rotated. Any distortion in static balance of the wheel 22 will cause the same to come to rest with the distortion at the bottom. Usually it may be assumed that any "unbalanced" condition is due to warping or to road hazards and such conditions can be corrected by simply pressing the rim of the wheel outwardly, against a counter-pressure near the hub, to urge the same into proper axial balance.

The bars 37 and 38 are moved toward the wheel 22 by a lever 66 on one side of the housing 10, as shown in Figures 2 and 6, which extends through a wall of the housing 10 and has a crank 67 on its lower end which is connected by a link 68 to the lever 43 at the juncture of the arm 46 therewith. Thus, as the lever 66 is actuated the bars 37 and 38 are moved toward the wheel 22 but there is no pressure exerted on the members 37 and 38 since their movement must be free and relatively sensitive for best results, and the paired V-pulleys 39 are provided to insure smooth and unhindered movement.

Pressure is exerted against the rim 69 of the wheel 22 at the point where it is closest to the machine, or the rollers 63. Forces thus applied will always tend to straighten the wheel and cause an axial or dynamic balance. A hydraulic jack 70 is provided to apply the pressure to the rim 69 and is supported in the housing 10 by a pair of arms 71 whose upper ends are pivotally secured to a rod 72 whose function will presently become manifest. The base 73 of the jack 70 has a pair of lugs 74 integral therewith and these are pivotally secured near the lower ends of the arms 71. The longitudinal axis of the jack plunger or ram 75 can be adjusted upwardly or downwardly by an adjusting screw 76 arranged through a transverse member 77 integrally connecting the arms 71 at their lowermost ends.

The operative end of the ram 75 has an anvil head or shoe 78 thereon formed in a suitable arc to conform to the circular contour of the wheel rim 69, as apparent in Figure 2. The jack 70 is operated by a lever 79 on a side of the housing 10, its lower end projecting into the housing and having a crank assembly 80 thereon which is connected to the pump beam 81 of the jack 70 by an arm 82, as shown in Figure 5.

The jack valve 83 is opened and closed by a rod 84 which extends upwardly through the top 19 of the housing 10 and has a knurled knob 85 on its upper end by which it is rotated to actuate the valve 83 through the bevelled gears 86 at the lower end of the rod 84. A pull spring 87, connected at one end to a lug 88 on the ram 75 and at its opposite end to the base 73 of the jack, returns the ram 75 to inoperative position when the valve 83 is opened.

The arms 71 become wider toward their upper ends and their rear edges 89 are curved to provide cams which engage the washer 28 on the rearmost end of the spindle 23 and thus afford a fulcrum which, when pressure is applied to the rim 69 through the jack 70, and consequently against the lower ends of the arms 71, will enable a counter-pressure to be applied on the rod 72 to which the upper ends of the arms 71 are pivotally connected.

The rod 72 is adapted to move longitudinally and extends through the plate 27 and the flange of the sleeve 26 so that its outer end will move toward the flanged member 30, the block or shoe 90 on the tip of the rod 72 engaging the member 30 to effect a counter-pressure opposite that of the jack ram 75. It will be noted, however, that while the pressure exerted by the jack ram 75 is against the rim 69 of the wheel 22 the applied counter-pressure of the rod 72 is near the hub of the wheel 22, otherwise the desired results could not be accomplished. It is also desirable to avoid undue stress on the spindle 23 or on the bearings 24 and 25.

The inner end of the rod 72 is slidably supported in a sleeve 91 secured to a frame member 92 in the back of the housing 10, the longitudinal movement of the rod 72 in the sleeve 91 being restricted by an adjusting screw 93 threaded through the member 92 and in axial alignment with the rod 72. Tension is constantly exerted on the rod 72 to retain the same in inoperative position by a pull spring 94 which has one end attached to an arm 95, rigidly secured to the upper ends of the arms 71, and has its opposite end secured to one of the upper angular brackets 41 which supports the upper gauging bar 37. The spring 94 also functions to retain the lower front edges of the arms 71 against the stop 96 on a bracket 97 attached to the lower side of the sleeve 26.

It will be observed that all of the wheel engaging elements are in vertical alignment with the spindle 23, and this is apparent in Figure 2. The front and rear panels 13 and 14 can be removed to gain access to the parts without affecting the supporting frame members. The form of the housing 10, however, is not a prime factor since any desirable housing or cabinet may be adapted.

In operation, therefore, a wheel 22 which has been bent or distorted, with respect to its axis, can be attached to the spindle 23 and secured thereon by the members 30 and 31 through the medium of the nut 36, and rotated to a position where the ram 75 of the hydraulic jack 70 can be applied to the inner surface of the rim 69 of the wheel, as apparent in Figure 1, at the point where the distortion occurs on the inner side of the wheel, determined by the action of the indicator 21 on the dial 20 in the top of the cabinet 10. This is accomplished through the operation of the arms 37 and 38 whose rollers 63 thereon will measure the degree of the distortion in the wheel and enable the operator to determine the amount of pressure to be applied thereagainst to correct such distortion.

After applying pressure through the medium of the ram 75 of the jack 70, the latter can be withdrawn and the wheel again checked by the indicator 20 to determine whether or not additional pressure is required to correct any distortion still remaining in the wheel with respect to its axis. Whereupon additional pressure can be applied, if necessary, until the wheel is in axial balance.

Manifestly, the structure herein shown and described is capable of certain changes and modifications in arrangement and design of parts, by persons skilled in the art, without departing from the spirit and intent of the invention or the scope of the appended claims.

What is claimed is:

1. In a wheel straightening mechanism having a housing, in combination, a free rotatable spindle supported in said housing and having means on one end for attaching a wheel thereto, gauging means in said housing capable of longitudinal sliding motion therein and spaced from said spindle on either side, the said means having means arranged on the operative ends thereof engageable with one side of said tire at diametrically opposite points and one each side of said spindle, an indicator on said housing indicating the relative positions of said gauging means with respect to each other, means for exerting a pressure on the rim of said wheel and means engaging said wheel attaching means on said spindle exerting a counter-pressure whereby to straighten the said wheel.

2. A wheel straightening mechanism for wheels having pneumatic tires thereon, the combination comprising a housing, a freely rotatable spindle in said housing extending therefrom and having means on its outer end for attaching a tired wheel, gauging means longitudinally movable in said housing and having means thereon operatively engageable with the tire on said wheel, indicator means on said housing connected with said gauging means for indicating a distortion in said wheel relative to its rotating axis, means in said housing for exerting a force against the rim of said wheel, and means opposing said force exerting means engaging the hub flange of said wheel exerting a counter-force thereon.

3. In a wheel straightening mechanism for automotive wheels having pneumatic tires thereon, in combination with a housing having an indicator thereon, a rotatable spindle in said housing extending therefrom and having means thereon for attaching a tired wheel for testing its rotative balance, gauging means supported by said housing and operatively connected to said indicator, means on said gauging means for engaging a tire on said wheel whereby to indicate the degree of distortion in the axial alignment of said wheel, means for exerting a force against the rim of said wheel, and means for providing a counter-force on the said wheel adjacent the hub thereof opposing said force exerting means.

4. In a mechanism for correcting axial distortions in wheels having pneumatic tires thereon, in combination, a frame having an indicator thereon for indicating the axial distortion of a wheel, a spindle rotatively supported in said frame and projecting therefrom and having means on the projected end for attachment of said wheel thereon, a gauging bar movably arranged on said frame and engageable with the tire of said wheel, means operatively connecting said gauging bar with said indicator whereby to indicate the degree of distortion in said wheel when the same is rotated, means supported in said frame for exerting a force against the rim of said wheel, and means engageable with the hub flange of said wheel opposite said force exerting means.

5. In a device for correcting axial distortion in automotive wheels having pneumatic tires thereon, in combination with a housing having an indicator thereon, a rotatable spindle supported in said housing and projecting therefrom, means on the projecting end of said spindle for attaching an automotive wheel, indicating bars movably arranged on opposite sides of said spindle and projecting from said housing to operatively engage a side of the tire of said wheel at diametrically opposed points thereon and on opposite sides of said spindle, means operatively connecting said bars to said indicator, means for exerting a force against the rim of said wheel on one side of said spindle, means on the opposite side of said spindle for exerting a counter-force on the hub flange of said wheel opposite said force exerting means, and means in said housing exerting a counter-force on said spindle in opposition to said force exerting means.

References Cited in the file of this patent

UNITED STATES PATENTS

| 1,702,794 | Nicholls | Feb. 19, 1929 |
| 1,992,521 | Creagmile | Feb. 26, 1935 |
| 2,033,048 | Nimcheck | Mar. 3, 1936 |
| 2,244,927 | Van Stone et al. | June 10, 1941 |
| 2,595,604 | Pascoc | May 6, 1952 |